(12) United States Patent
Shipulski et al.

(10) Patent No.: US 10,455,682 B2
(45) Date of Patent: Oct. 22, 2019

(54) OPTIMIZATION AND CONTROL OF MATERIAL PROCESSING USING A THERMAL PROCESSING TORCH

(75) Inventors: E. Michael Shipulski, Etna, NH (US); Richard Anderson, Grantham, NH (US); Peter Brahan, North Sutton, NH (US); Wayne Chin, Lebanon, NH (US); Stephen Liebold, Grantham, NH (US); Guy Best, Bethel, VT (US); Jon Lindsay, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 1957 days.

(21) Appl. No.: 13/439,259

(22) Filed: Apr. 4, 2012

(65) Prior Publication Data

US 2013/0264320 A1    Oct. 10, 2013

(51) Int. Cl.
*G06K 7/10* (2006.01)
*H05H 1/34* (2006.01)
*B23K 9/32* (2006.01)
*B23K 10/00* (2006.01)

(52) U.S. Cl.
CPC ............. *H05H 1/34* (2013.01); *B23K 9/32* (2013.01); *B23K 10/00* (2013.01); *H05H 2001/3473* (2013.01); *H05H 2001/3494* (2013.01)

(58) Field of Classification Search
CPC ........ B23K 35/02; B23K 37/00; B23K 37/02; B23K 9/1336; B23K 9/295
USPC .................. 219/137.2, 137.31, 138; 340/593
See application file for complete search history.

(56) References Cited

U.S. PATENT DOCUMENTS

| | | | |
|---|---|---|---|
| 2,985,050 A | 5/1961 | Schwatcha | |
| 3,010,012 A | 11/1961 | Tuthill | |
| 3,018,360 A | 1/1962 | Engel | |
| 3,518,401 A | 6/1970 | Mathews | |
| 3,602,683 A | 8/1971 | Hishida et al. | |
| 4,125,754 A | 11/1978 | Wasserman et al. | |
| 4,497,029 A | 1/1985 | Kiyokawa | |
| 4,519,835 A | 5/1985 | Gauvin et al. | |
| 4,588,880 A | 5/1986 | Hesser | |
| 4,733,052 A | 3/1988 | Nilsson et al. | |
| 4,742,470 A * | 5/1988 | Juengel ................. | G05B 19/128 340/10.34 |
| 4,929,811 A | 5/1990 | Blankenship | |

(Continued)

FOREIGN PATENT DOCUMENTS

CA    2 439 213    10/2006
EP    0508482 A2    10/1992

(Continued)

OTHER PUBLICATIONS

Torchmate® Arc Voltage Torch Height Control—Operation Manual, Applied Robotics, Inc., Oct. 2005, pp. 1-19.

(Continued)

*Primary Examiner* — Jimmy Chou
(74) *Attorney, Agent, or Firm* — Prokauer Rose LLP (57) ABSTRACT

A consumable component for a thermal processing torch is provided. The consumable component includes a consumable component body and a signal device located on or within the consumable component body for transmitting a signal associated with the consumable component. The signal can be independent of a detectable physical characteristic of the consumable component.

10 Claims, 4 Drawing Sheets

(56) References Cited

U.S. PATENT DOCUMENTS

| | | |
|---|---|---|
| 5,018,670 A | 5/1991 | Chalmers |
| 5,050,106 A | 5/1991 | Yamamato et al. |
| 5,086,655 A | 2/1992 | Fredericks et al. |
| 5,099,226 A | 3/1992 | Andrews |
| 5,248,867 A | 9/1993 | Ohba et al. |
| 5,309,683 A | 5/1994 | Hockett |
| 5,357,076 A * | 10/1994 | Blankenship ............ H05H 1/36 |
| | | 219/121.54 |
| 5,381,487 A | 1/1995 | Shamos |
| 5,388,965 A | 2/1995 | Fehn |
| 5,390,964 A | 2/1995 | Gray, Jr. |
| 5,400,389 A | 3/1995 | Niiyama et al. |
| 5,440,477 A | 8/1995 | Rohrberg et al. |
| 5,500,512 A | 3/1996 | Goldblatt |
| 5,556,562 A * | 9/1996 | Sorenson ................ 219/137.61 |
| 5,653,264 A | 8/1997 | Atkinson |
| 5,717,187 A | 2/1998 | Rogozinski et al. |
| 5,860,849 A | 1/1999 | Miller |
| 5,994,663 A | 11/1999 | Lu |
| 6,047,579 A | 4/2000 | Schmitz |
| 6,130,407 A | 10/2000 | Villafuerte |
| 6,201,207 B1 | 3/2001 | Maruyama et al. |
| 6,248,975 B1 | 6/2001 | Lanouette et al. |
| 6,259,059 B1 | 7/2001 | Hsu |
| 6,267,291 B1 | 7/2001 | Blankenship et al. |
| 6,326,583 B1 | 12/2001 | Hardwick et al. |
| 6,409,476 B2 | 6/2002 | Mills |
| 6,479,793 B1 | 11/2002 | Wittmann et al. |
| 6,510,984 B2 | 1/2003 | Blankenship et al. |
| 6,539,818 B1 | 4/2003 | Horiuchi et al. |
| 6,563,085 B2 | 5/2003 | Lanouette et al. |
| 6,657,162 B1 | 12/2003 | Jung et al. |
| 6,659,098 B1 | 12/2003 | Sekiya |
| 6,693,252 B2 | 2/2004 | Zhang et al. |
| 6,707,304 B2 * | 3/2004 | Buhler ................. B23K 20/004 |
| | | 219/69.11 |
| 6,717,096 B2 | 4/2004 | Hewett et al. |
| 6,729,468 B1 | 5/2004 | Dobmeier |
| 6,772,040 B1 | 8/2004 | Picard et al. |
| 6,781,085 B2 | 8/2004 | Ulrich et al. |
| 6,933,462 B2 | 8/2005 | Iriyama et al. |
| 6,960,737 B2 | 11/2005 | Tatham |
| 6,980,704 B2 | 12/2005 | Kia et al. |
| 6,992,262 B2 * | 1/2006 | Matus .................. B23K 10/006 |
| | | 219/121.39 |
| 6,995,545 B2 | 2/2006 | Tracy et al. |
| 7,030,337 B2 | 4/2006 | Baker et al. |
| 7,032,814 B2 * | 4/2006 | Blankenship ................ 235/375 |
| 7,115,833 B2 | 10/2006 | Higgins et al. |
| 7,186,944 B2 * | 3/2007 | Matus ................. B23K 9/0956 |
| | | 219/121.39 |
| 7,307,533 B2 * | 12/2007 | Ishii ..................... G06K 7/0008 |
| | | 340/10.1 |
| 7,358,458 B2 * | 4/2008 | Daniel ................. B23K 9/0956 |
| | | 219/130.01 |
| 7,375,302 B2 | 5/2008 | Twarog et al. |
| 7,411,154 B2 | 8/2008 | Fosbinder et al. |
| 7,645,960 B2 | 1/2010 | Stava |
| 7,671,294 B2 | 3/2010 | Belashchenko et al. |
| 7,680,625 B2 | 3/2010 | Trowbridge et al. |
| 7,843,334 B2 * | 11/2010 | Kumagai ............... G06Q 30/02 |
| | | 340/10.51 |
| 8,035,487 B2 | 10/2011 | Malackowski |
| 8,085,150 B2 | 12/2011 | Oberle |
| 8,141,240 B2 | 3/2012 | Hiew et al. |
| 8,203,095 B2 * | 6/2012 | Storm et al. ............. 219/121.47 |
| 8,204,618 B2 | 6/2012 | Young, Jr. et al. |
| 8,242,907 B2 | 8/2012 | Butler et al. |
| 8,263,896 B2 | 9/2012 | Schneider |
| 8,272,794 B2 | 9/2012 | Silchenstedt et al. |
| 8,278,588 B2 | 10/2012 | Salsich et al. |
| 8,316,742 B2 | 11/2012 | Craig |
| 8,373,084 B2 | 2/2013 | Salsich |
| 8,376,671 B2 | 2/2013 | Kaneko |
| 8,395,076 B2 | 3/2013 | Matus |
| 8,431,862 B2 | 4/2013 | Kachline |
| 8,620,738 B2 | 12/2013 | Fordyce, III et al. |
| 8,658,941 B2 | 2/2014 | Albrecht |
| 8,686,318 B2 | 4/2014 | Albrecht et al. |
| 8,748,776 B2 | 6/2014 | Albrecht et al. |
| 8,759,715 B2 | 6/2014 | Narayanan et al. |
| 8,766,132 B2 | 7/2014 | Blankenship et al. |
| 8,859,828 B2 | 10/2014 | Liu et al. |
| 8,859,928 B2 | 10/2014 | Sommerfeld |
| 9,031,683 B2 | 5/2015 | Elfstrom et al. |
| 9,129,330 B2 | 9/2015 | Albrecht et al. |
| 9,229,436 B2 | 1/2016 | Stumpfl et al. |
| 2002/0117484 A1 | 8/2002 | Jones et al. |
| 2003/0025598 A1 | 2/2003 | Wolf et al. |
| 2003/0094487 A1 | 5/2003 | Blankenship et al. |
| 2003/0148709 A1 | 8/2003 | Anand et al. |
| 2004/0004064 A1 | 1/2004 | Lanouette et al. |
| 2004/0031776 A1 | 2/2004 | Gevelber et al. |
| 2004/0106101 A1 | 6/2004 | Evans |
| 2004/0193307 A1 | 9/2004 | Fujishima et al. |
| 2005/0045599 A1 | 3/2005 | Matus |
| 2005/0109738 A1 | 5/2005 | Hewett et al. |
| 2005/0145688 A1 | 7/2005 | Milenkovic et al. |
| 2005/0173390 A1 | 8/2005 | Lanouette et al. |
| 2006/0006154 A1 | 1/2006 | Koike |
| 2006/0070986 A1 | 4/2006 | Ihde et al. |
| 2006/0163216 A1 | 7/2006 | Brandt et al. |
| 2006/0163228 A1 * | 7/2006 | Daniel ................. B23K 9/0956 |
| | | 219/130.01 |
| 2006/0163230 A1 | 7/2006 | Kaufman |
| 2006/0201923 A1 | 9/2006 | Hutchison |
| 2006/0289406 A1 * | 12/2006 | Helenius .................. H05H 1/28 |
| | | 219/121.48 |
| 2007/0012099 A1 | 1/2007 | Becourt |
| 2007/0051711 A1 * | 3/2007 | Kachline ................. 219/130.01 |
| 2007/0080149 A1 | 4/2007 | Albrecht et al. |
| 2007/0080151 A1 | 4/2007 | Albrecht et al. |
| 2007/0080152 A1 | 4/2007 | Albrecht et al. |
| 2007/0080153 A1 | 4/2007 | Albrecht et al. |
| 2007/0210034 A1 | 9/2007 | Mather et al. |
| 2007/0294608 A1 | 12/2007 | Winterhalter et al. |
| 2008/0001752 A1 | 1/2008 | Bruns |
| 2008/0011821 A1 | 1/2008 | Ellender et al. |
| 2008/0023451 A1 | 1/2008 | Salsich et al. |
| 2008/0061049 A1 | 3/2008 | Albrecht |
| 2008/0066596 A1 | 3/2008 | Yamaguchi |
| 2008/0083711 A1 | 4/2008 | Twarog et al. |
| 2008/0093476 A1 | 4/2008 | Johnson et al. |
| 2008/0149608 A1 | 6/2008 | Albrecht |
| 2008/0149686 A1 | 6/2008 | Daniel et al. |
| 2008/0156783 A1 | 7/2008 | Vanden Heuvel et al. |
| 2008/0223952 A1 | 9/2008 | Wernli et al. |
| 2008/0257874 A1 | 10/2008 | Kaufman et al. |
| 2008/0308641 A1 | 12/2008 | Finn |
| 2009/0008370 A1 | 1/2009 | Salsich et al. |
| 2009/0057286 A1 * | 3/2009 | Ihara ................... B23K 9/0953 |
| | | 219/130.21 |
| 2009/0065489 A1 | 3/2009 | Duffy |
| 2009/0107960 A1 | 4/2009 | Hampton |
| 2009/0152255 A1 | 6/2009 | Ma |
| 2009/0159572 A1 | 6/2009 | Salsich |
| 2009/0159575 A1 | 6/2009 | Salsich |
| 2009/0163130 A1 | 6/2009 | Zambergs |
| 2009/0184098 A1 | 7/2009 | Daniel et al. |
| 2009/0212027 A1 | 8/2009 | Borowy et al. |
| 2009/0219136 A1 | 9/2009 | Brunet et al. |
| 2009/0222804 A1 | 9/2009 | Kaufman |
| 2009/0230097 A1 | 9/2009 | Liebold et al. |
| 2009/0240368 A1 | 9/2009 | Young, Jr. et al. |
| 2009/0288532 A1 | 11/2009 | Hashish |
| 2010/0078408 A1 | 4/2010 | Liebold et al. |
| 2010/0084381 A1 | 4/2010 | Indraczek et al. |
| 2010/0155377 A1 | 6/2010 | Lindsay et al. |
| 2010/0324868 A1 | 12/2010 | Russell et al. |
| 2011/0000893 A1 | 1/2011 | Blankenship et al. |
| 2011/0029385 A1 | 2/2011 | Engel et al. |
| 2011/0114616 A1 | 5/2011 | Albrecht |
| 2011/0163857 A1 | 7/2011 | August et al. |

(56) References Cited

U.S. PATENT DOCUMENTS

| | | |
|---|---|---|
| 2011/0220630 A1 | 9/2011 | Speilman et al. |
| 2011/0294401 A1 | 12/2011 | Habermann et al. |
| 2012/0021676 A1 | 1/2012 | Schubert et al. |
| 2012/0138583 A1 | 6/2012 | Winn et al. |
| 2012/0139692 A1 | 6/2012 | Neubauer et al. |
| 2012/0234803 A1 | 9/2012 | Liu et al. |
| 2012/0241428 A1 | 9/2012 | Kowaleski |
| 2012/0247293 A1 | 10/2012 | Nagai et al. |
| 2013/0001221 A1 | 1/2013 | Lambert |
| 2013/0068732 A1 | 3/2013 | Watson et al. |
| 2013/0087537 A1 | 4/2013 | Barnett et al. |
| 2013/0179241 A1 | 7/2013 | Liu |
| 2013/0210319 A1 | 8/2013 | Gramling et al. |
| 2013/0263420 A1 | 10/2013 | Shipulski |
| 2013/0264317 A1 | 10/2013 | Hoffa et al. |
| 2013/0264320 A1 | 10/2013 | Shipulski et al. |
| 2014/0069895 A1 | 3/2014 | Brine et al. |
| 2014/0335761 A1 | 11/2014 | Chou et al. |
| 2015/0108223 A1 | 4/2015 | Weitzhandler |
| 2015/0332071 A1 | 11/2015 | Hoffa et al. |
| 2015/0371129 A1 | 12/2015 | Hoffa et al. |
| 2016/0221108 A1 | 8/2016 | Hoffa et al. |
| 2017/0042011 A1 | 2/2017 | Sanders et al. |
| 2017/0046544 A1 | 2/2017 | Ikemoto |

FOREIGN PATENT DOCUMENTS

| | | | |
|---|---|---|---|
| EP | 1065620 | 1/2001 | |
| EP | 1117279 A1 * | 7/2001 | ............... H05H 1/36 |
| EP | 1288016 | 3/2003 | |
| EP | 1516688 A1 | 3/2005 | |
| EP | 1522371 A1 | 4/2005 | |
| JP | 61063368 | 4/1986 | |
| JP | S61-63368 | 4/1986 | |
| JP | H05154732 A | 6/1993 | |
| JP | H11285831 A | 10/1999 | |
| JP | 2003025176 A | 1/2003 | |
| JP | 2003048134 A | 2/2003 | |
| JP | 2009252085 A | 10/2009 | |
| JP | 2012048287 A | 3/2012 | |
| JP | 2012079221 A | 4/2012 | |
| WO | 2008/144785 A1 | 12/2008 | |
| WO | 2010/142858 A1 | 12/2010 | |
| WO | 2013000700 A1 | 1/2013 | |
| WO | 2013/151602 | 10/2013 | |
| WO | 2013/151886 | 10/2013 | |

OTHER PUBLICATIONS

International Search Report for International Application No. PCT/US2013/021364 dated Jan. 14, 2013 4 pages.
International Search Report for International Application No. PCT/US2013/034572 dated Mar. 29, 2013 4 pages.
U.S. Appl. No. 13/560,059, filed Jul. 27, 2012, Shipulski.
U.S. Appl. No. 14/075,692, filed Nov. 8, 2013, Lindsay et al.
U.S. Appl. No. 13/838,919, filed Mar. 15, 2013, Hoffa et al.
U.S. Appl. No. 14/135,714, filed Dec. 20, 2013, Lindsay et al.
U.S. Appl. No. 14/589,270, filed Jan. 5, 2015, Brandt et al.
U.S. Appl. No. 14/807,589, filed Jul. 23, 2015, Hoffa et al.
U.S. Appl. No. 14/807,679, filed Jul. 23, 2015, Hoffa et al.
U.S. Appl. No. 13/949,364, filed Jul. 24, 2013, Brine et al.
U.S. Appl. No. 14/053,078, filed Oct. 14, 2013, Adams et al.
U.S. Appl. No. 14/079,163, filed Nov. 13, 2013, Brine et al.
U.S. Appl. No. 14/486,569, filed Sep. 15, 2014, Mao et al.
U.S. Appl. No. 14/641,897, filed Mar. 9, 2015, Vandergon et al.
Examination Report for corresponding Australian Patent Application No. 2013243978, dated Nov. 17, 2015, 4 pages.

* cited by examiner

OPTIMIZATION AND CONTROL OF MATERIAL PROCESSING USING A THERMAL PROCESSING TORCH

FIELD OF THE INVENTION

The present invention relates generally to controlling and optimizing material processing using signals associated with consumables of a thermal processing torch.

BACKGROUND OF THE INVENTION

Thermal processing torches, such as plasma arc torches, are widely used in the heating, cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and the nozzle. In some torches, a retaining cap can be used to maintain the nozzle and/or swirl ring in the plasma arc torch. In operation, the torch produces a plasma arc, which is a constricted jet of an ionized gas with high temperature and sufficient momentum to assist with removal of molten metal.

Typically, a plasma arc torch includes multiple consumables. Each consumable can be selected to achieve optimal performance (e.g., an optimal current level, maximum lifespan, etc.) in view of specific processing constraints, such as the type of material being cut and/or the cut shape desired. Installing incorrect consumables into a torch can result in poor cut quality and decreased cut speed. In addition, incorrect consumables can reduce consumable life and lead to premature consumable failure. Even when correct consumables are installed in a torch, it can be difficult for an operator to manually configure and optimize torch operating parameters corresponding to the selected consumable set. Moreover, it can be difficult for a torch component manufacturer to guarantee performance if aftermarket consumables are used in a torch system.

SUMMARY OF THE INVENTION

Thus, systems and methods are needed to detect incompatible consumables in a plasma arc torch. In addition, systems and methods are needed to automatically adjust torch operating parameters to enhance cutting quality and prolong consumable life. Specifically, systems and methods are needed to efficiently convey information among various components of a torch system to facilitate operation control and optimization.

In one aspect, a consumable component of a thermal processing torch is provided. The consumable component includes a consumable component body and a signal device located on or inside of the consumable component body for transmitting a signal associated with the consumable component. The signal is independent of a detectable physical characteristic of the consumable component.

In another aspect, a method is provided for conveying information about a consumable component of a thermal processing torch that includes a signal receiver. The method includes installing into the torch the signal receiver and the consumable component. The consumable component has a signal component attached thereto. The signal component is adapted to generate a signal conveying the information about the consumable component. The method also includes passing the signal from the signal component to the signal receiver.

In another aspect, a system is provided for conveying information about a thermal processing torch. The system includes a signal detector and at least one consumable selected from a group including an electrode, a nozzle, a shield, a retaining cap, a welding tip, and a swirl ring. The system also includes at least one signal device attached to the at least one consumable for conveying information about the at least one consumable to the signal detector. The system further includes a controller coupled to the signal detector for i) receiving the information from the at least one signal device, and ii) transmitting a least a portion of the information to at least one of a processor, a gas console, nesting software, a height controller, and a drive motor. At least one of the processor, the gas console, the nesting software, the height controller, and the drive motor adjusts torch operation based on the information.

In other examples, any of the aspects above can include one or more of the following features. In some embodiments, the signal device is a radio-frequency identification (RFID) tag for storing information assigned to the consumable component. In some embodiments, the signal is one of a radio signal, a pneumatic signal, a magnetic signal, an optical signal, or a hydraulic signal. In some embodiments, the torch is a plasma arc torch.

In some embodiments, the signal transmitted by the signal device identifies at least one feature unique to a type of the consumable component. The type of the consumable component can include a nozzle, a shield, an electrode, an inner retaining cap, an outer retaining cap, a swirl ring, a welding tip or a replaceable torch body. The signal transmitted by the signal device can also identify at least one feature unique to the consumable component.

In some embodiments, the signal device is located at a surface of the body to minimize heat exposure during torch operation. This surface can be adjacent to a cooling mechanism of the torch, remote from a plasma arc of the torch, or in an o-ring channel of the torch, or a combination thereof. The signal device can be shielded by another torch component to minimize exposure of the signal device to at least one of thermal energy, radiation, damaging gases, or high-frequency energy.

In some embodiments, the signaling device is adapted to transmit the signal before, during or after plasma arc ignition, or a combination thereof. In some embodiments, the signal transmitted by the signal device is readable from inside of the torch after the consumable component is installed in the torch. The signal transmitted by the signal device can also be readable from outside of the torch after the consumable component is installed in the torch.

In some embodiments, the signal component includes a sensor for measuring a physical modification of the consumable component. The physical modification can include modification of the consumable component to restrict a flow rate of a gas therethrough.

In another aspect, a method is provided for identifying consumables in a thermal processing system including a torch. The method includes providing a first consumable having a first characteristic and a second consumable having a second characteristic. The second characteristic is different from the first characteristic and at least one of the first or second characteristics is independent of a measured physical property of the corresponding consumable. The method also includes installing at least one of the first and second consumables into the torch. The method further includes communicating information about at least one of the first characteristic of the first consumable or the second characteristic of the second consumable to a controller by a first methodology.

In some embodiments, the method includes communicating information about the first characteristic of the first consumable and the second characteristic of the consumable to the controller by the first methodology.

In some embodiments, the method further includes communicating information about the first characteristic of the first consumable to the controller by the first methodology and communicating information about the second characteristic of the second consumable to the controller by a second methodology. The second methodology is different from the first methodology. The first methodology can include using a first signal device coupled to the first consumable to transmit the first characteristic as a first signal. The second methodology can include using a second signal device coupled to the second consumable to transmit the second characteristic as a second signal. The first or second signal includes a pneumatic signal, a radio signal, a light signal, a magnetic signal or a hydraulic signal.

In some embodiments, the first consumable and the second consumable are substantially the same. In some embodiments, the first methodology includes using a signal device coupled to at least one of the first consumable or the second consumable to communicate the information as a signal. The signal can be a pneumatic signal, a radio signal, a light signal, a magnetic signal or a hydraulic signal.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
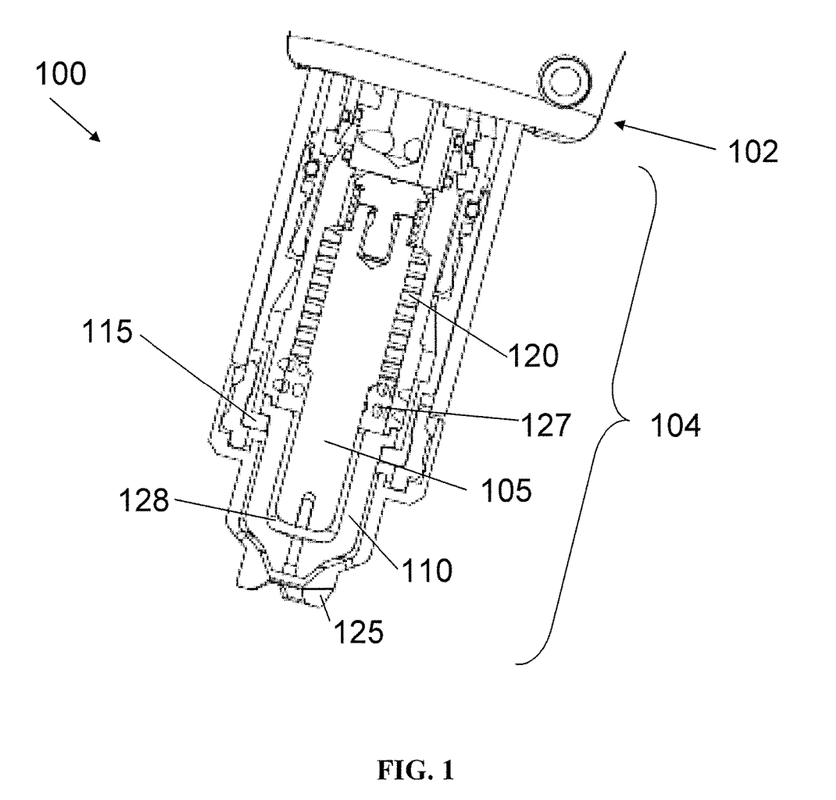
FIG. 1 shows a cross-sectional view of an exemplary plasma arc torch.

FIG. 1 is a cross-sectional view of an exemplary plasma arc torch 100 including a torch body 102 and a torch tip 104. The torch tip 104 includes multiple consumables, for example, an electrode 105, a nozzle 110, a retaining cap 115, a swirl ring 120, and a shield 125. The torch body 102, which has a generally cylindrical shape, supports the electrode 105 and the nozzle 110. The nozzle 110 is spaced from the electrode 105 and has a central exit orifice mounted within the torch body 102. The swirl ring 120 is mounted to the torch body 102 and has a set of radially offset or canted gas distribution holes 127 that impart a tangential velocity component to the plasma gas flow, causing the plasma gas flow to swirl. The shield 125, which also includes an exit orifice, is connected (e.g., threaded) to the retaining cap 115. The retaining cap 115 as shown is an inner retaining cap securely connected (e.g., threaded) to the nozzle 110. In some embodiments, an outer retaining cap (not shown) is secured relative to the shield 125. The torch 100 can additionally include electrical connections, passages for cooling, passages for arc control fluids (e.g., plasma gas), and a power supply. In some embodiments, the consumables include a welding tip, which is a nozzle for passing an ignited welding gas.

In operation, plasma gas flows through a gas inlet tube (not shown) and the gas distribution holes 127 in the swirl ring 120. From there, the plasma gas flows into a plasma chamber 128 and out of the torch 100 through the exit orifice of the nozzle 110 and the shield 125. A pilot arc is first generated between the electrode 105 and the nozzle 110. The pilot arc ionizes the gas passing through the nozzle exit orifice and the shield exit orifice. The arc then transfers from the nozzle 110 to a workpiece (not shown) for thermally processing (e.g., cutting or welding) the workpiece. It is noted that the illustrated details of the torch 100, including the arrangement of the components, the direction of gas and cooling fluid flows, and the electrical connections, can take a variety of forms.

Different operating processes often require different shield and/or plasma gas flow rates, which require different sets of consumables. This leads to a variety of consumables being used in the field. Using the correct consumables and matching them appropriately is necessary to achieve optimal cutting performance. Consumable mismatch (e.g., using a consumable made for operation at 65 Amps in a torch that is being operated at 105 Amps) can result in poor consumable life and/or poor performance of the plasma arc torch.

Figure 2:
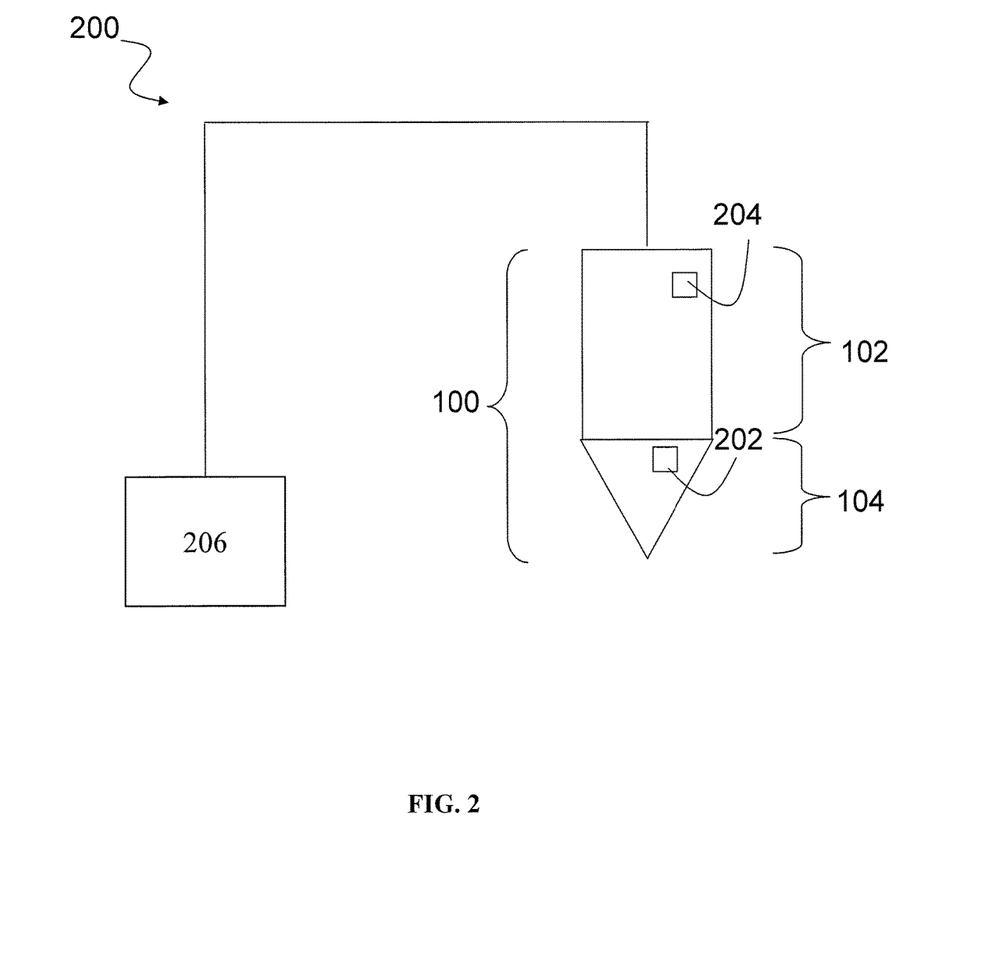
FIG. 2 shows an exemplary communication network.

FIG. 2 shows an exemplary communication network 200 of the present invention. The communication network 200 includes one or more signal devices 202, each assigned to a consumable of a thermal processing torch, such as the plasma arc torch 100 of FIG. 1. Exemplary consumables include the electrode 105, the nozzle 110, the retaining cap 115, the swirl ring 120, and the shield 125. In some embodiments, a signal device 202 is an electrically writable device configured to transmit information about a consumable in the form of one or more signals. For example, the signal device 202 can be a radio-frequency identification (RFID) tag or card, bar code label or tag, integrated circuit (IC) plate, or the like. In some embodiments, a signal device 202 is a detector (e.g., a sensor) for detecting a physical characteristic of the consumable and transmitting the detected information in the form of one or more signals. The communication network 200 also includes at least one receiver 204 for i) receiving signals transmitted by the signal devices 202, ii) extracting data conveyed by the signals, and iii) providing the extracted data to a processor 206 for analysis and further action. The processor 206 can be a digital signal processor (DSP), microprocessor, microcontroller, computer, computer numeric controller (CNC) machine tool, programmable logic controller (PLC), application-specific integrated circuit (ASIC), or the like.

In some embodiments, each signal device 202 is encoded with information pertaining to the consumable to which the signal device 202 is assigned. The encoded information can be generic or fixed information such as the consumable's name, trademark, manufacturer, serial number, and/or type. The encoded information, for example, can include a model number to generally indicate that the consumable is a nozzle. In some embodiments, the encoded information is unique to the consumable, such as metal composition of the consumable, weight of the consumable, date, time and/or location at which the consumable was manufactured, personnel responsible for the consumable, and the like. As an example, the encoded information can provide a serial number, which is unique to each torch component manufactured, to distinguish, for example, nozzle Type A, Serial #1 from nozzle Type A, Serial #2.

In some embodiments, information is encoded to a signal device 202 at the time of manufacture of the corresponding consumable. Information can also be encoded to a signal device 202 during the lifetime of the consumable, such as after each consumable use. Such information can include the date, time and location of consumable use, any abnormalities detected during use, and/or consumable conditions after use so that a log can be created to predict a failure event or end-of-life event associated with the consumable.

Information encoded to a signal device 202 can also specify operating parameters. For example, for a signal device 202 associated with the shield 125, data encoded to the signal device 202 can indicate the type of shield gas and/or the appropriate gas flow rate for the shield 125. In some embodiments, encoded data of a signal device 202 provides information about other related torch components. For example, encoded data can identify other torch components that are compatible with the assigned consumable, assisting with installation of the entire consumable set in a torch to achieve certain performance metrics.

In some embodiments, a signal device 202 includes information about the corresponding consumable independent of a detectable physical characteristic of the consumable. Examples of detectable physical characteristics of the consumable include magnetic properties, surface reflectivity, density, acoustic properties and other tactile features of the consumable measured by a detector installed in the torch. Therefore, examples of consumable data independent of a detectable physical characteristic of the consumable can include consumable name, type, manufacturer, manufacturing date, manufacturing location, serial number, or other non-tactile features of a consumable. In some embodiments, the signal device 202 stores pre-collected information of the consumable, including physical characteristics, before it is installed into the torch, but the signal device 202 is not configured to actively measure or detect the physical characteristics. However, the signal device 202 can store physical characteristics about the consumable measured or detected by another device, such as by a sensor. Generally, the signal device 202 is used mainly for data storage purposes.

In some embodiments, the signal device 202 is located inside or on the torch 100. For example, the signal device 202 can be attached to a surface of a consumable that is ultimately installed inside of the torch tip 104. The signal device 202 can also be attached to a component inside of the torch 100 other than the assigned consumable. For example, while a signal device 202 is assigned to store data about the electrode 105, the signal device 202 can be affixed to a surface of the retaining cap 115. In some embodiments, the signal device 202 is coupled to an external source that is not physically associated with the torch 100. For example, the signal device 202 can be attached to a package used to store the consumable and is remote from the consumable once it is installed in the torch 100. If a signal device 202 is located inside of the torch 100, the surface to which the signal device 202 is attached can be selected to reduce or otherwise minimize heat exposure during operation of the torch 100. For example, the signal device 202 can be located near a cooling mechanism, away from the plasma arc, and/or in an o-ring channel of the torch 100 to reduce or minimize heat exposure. In addition, the signal device 202 can be coated with a heat protective material to prevent the device from overheating during torch operation. Generally, the signal device 202 can be situated, such as being shielded by another torch component, to minimize exposure to thermal energy, radiation, damaging gases (e.g., ozone), and/or high-frequency energy.

In some embodiments, a signal device 202 is designed to be durable, i.e., functional during and after one or more torch ignitions. In some embodiments, a signal device 202 is disposable after each torch use or after several uses. In some embodiments, a signal device 202 is writable once, for example, to encode information about a consumable when the consumable is first manufactured. In some embodiments, a signal device 202 is writable multiple times, such as throughout the lifespan of the corresponding consumable.

In the communication network 200, the signal device 202 can wirelessly transmit its stored information to the receiver 204 in the form of one or more signals. The receiver 204 is adapted to process these signals to extract pertinent data about the consumable and forward the data to the processor 206 for analysis. In some embodiments, the receiver 204 is located in or on the plasma arc torch 100. For example, the receiver 204 can be located in the torch body 102. In some embodiments, the receiver 204 is at a location external to the torch 100, such as attached to a power supply module, a gas console, the processor 206, etc.

In some embodiments, at least one of the signal devices 202 is an RFID tag and the receiver 204 is a reader used to interrogate the RFID tag. In such embodiments, the RFID tag includes a microchip for storing information and an antenna for receiving and transmitting RF signals. The reader can include 1) an antenna for transmitting RF signals to the RFID tag to interrogate the tag and 2) components for decoding a response transmitted by the RFID tag before forwarding the response to the processor 206. The RFID tag can be either active or passive. An active RFID tag includes a battery to produce a stronger electromagnetic return signal to the reader, thereby increasing the possible transmission distance between the RFID tag and the reader. The distance between an RFID tag and a reader can be from less than one inch to 100 feet or more, depending on the power output, the radio frequency used and the type of material through which the RF signals need to travel. In one example, the distance between an RFID tag and an antenna of a corresponding reader can be about 2-4 cm. A reader antenna and remaining reader components do not need be in the same packaging. For example, the reader antenna can be located on or inside of the torch body 102 while the remaining reader components are external to the torch 100. Using an RFID tag is advantageous because it does not require direct contact (e.g., via wires) or direct line of sight (e.g., via optical signals) with the reader and is well suited for use in harsh environments.

Figure 3:
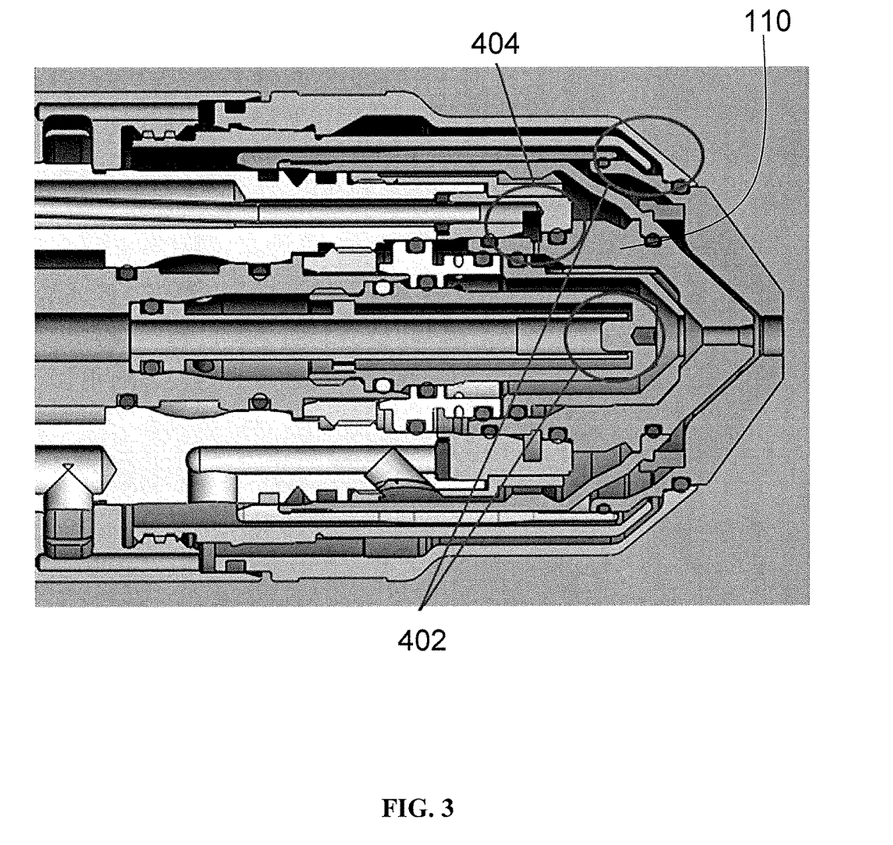
FIG. 3 shows altered geometry of various consumables.

In some embodiments, a signal device 202 is a detector (e.g., a sensor) for detecting at least one physical marker of the consumable for uniquely identifying the consumable by its type or individually. The physical marker can be a physical alteration of the consumable, for example. As shown in FIG. 3, identification of a consumable is achieved by altering the geometry of the consumable such that, when it is installed in the torch 100, it affects the wall of an adjacent coolant passageway 402, which in turn alters the rate of a coolant flowing therethrough. Specifically, the altered section of the coolant passageway 402 can restrict the rate of the coolant flow. A signal device 202 can be used to measure the pressure change as a function of the coolant flow rate. Hence, the measured coolant pressure change serves as an identification of the consumable. In another example as shown in FIG. 3, an auxiliary vent line 404 that is connected to a valve and a flow meter is attached to the nozzle 110 to identify the nozzle 110. The valve is opened prior to plasma arc ignition and the auxiliary vent line flow rate is measured by a signal device 202 as a function of plasma pressure during a purge cycle. Therefore, the measured flow rate serves as an identification of the nozzle 110. In another example, one or more uniquely sized metering holes (not shown) can be drilled into the outer retain cap to identify the cap once it is installed in the torch 100. The size of each metering hole is configured to uniquely affect the off-valve pressure and/or the flow rate of the shield gas. Therefore, these measurements, taken by a signal device 202 in a pre-flow routine prior to pilot arc ignition, serve to identify the outer retaining cap.

In yet another example, the shield 125 can be identified by measuring the consumable's length relative to a reference torch datum. In an exemplary measurement process, a torch height controller is used to determine the height at which a known torch fires and begins to cut a workpiece. This height can serve as the reference torch datum. Then, after installing an unidentified consumable into the torch, the height relative to the reference datum is determined. Therefore, simple calculations involving the two heights can be used to determine the relative length of the unidentified consumable. In turn, the relative consumable length can be used to identify the consumable by, for example, referencing a looking-up table that correlates relative consumable lengths to consumable parts.

In some embodiments, a signal device 202 is a barcode that provides optical machine-representation of data about the corresponding consumable. A barcode can be read by the receiver 204 in the form of a barcode reader. Generally, a signal device 202 can convey data about a consumable in the form of any machine readable signals, including radio signals, optical or other light-based signals (e.g., infrared signals or ultraviolet signals), magnetic signals, pneumatic signals, or hydraulic signals.

In some embodiments, a single signal device 202 is assigned to each consumable of a torch to transmit pertinent information about the corresponding consumable. In some embodiments, two or more signal devices 202 are assigned to the same consumable to transmit different information about that consumable. For example, one signal device 202 can transmit information unique to the consumable type, such as the model number and operating parameters for the consumable type, while another signal device 202 can transmit information unique to the consumable itself, such as weight and usage history of the consumable. In some embodiments, the signal devices 202 in the communication network 200 employ different modes of data transmission. For example, while one signal device 202 transmits data as RF signals, another signal device 202 transmits data as optical signals. In some embodiments, the network 200 includes multiple receivers 204. Each receiver 204 is configured (e.g., tuned) to read signals from one or more of the signal devices 202 and transmit the extracted data to the processor 206. In some embodiments, a single receiver 204 is used to read signals from all signal devices 202 in the communication network 200. The processor 206 thus can simultaneously process data associated with multiple consumables.

Figure 4:
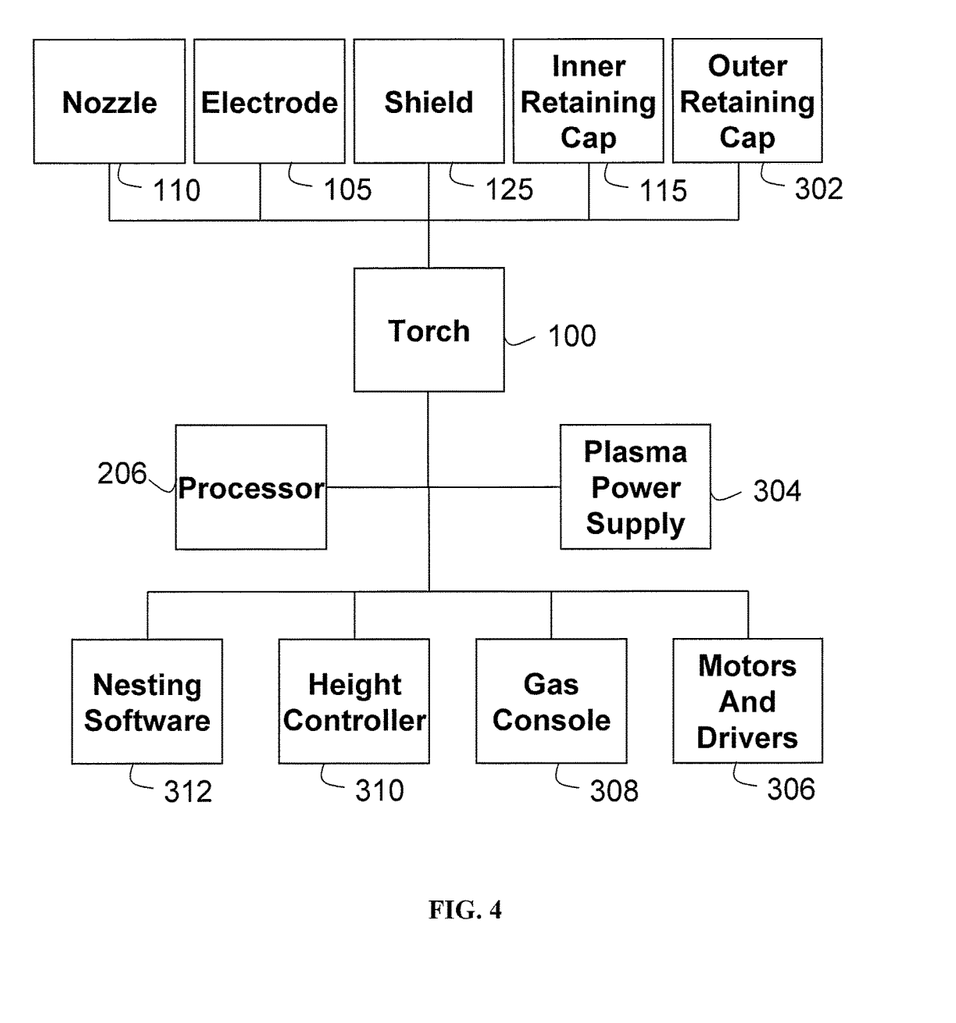
FIG. 4 shows an exemplary thermal processing system using the communication network of FIG. 2 to control the operation of a plasma arc torch.

FIG. 4 is an exemplary thermal processing system 300 using the communication network of FIG. 2 to control the operation of a thermal processing torch, such as the plasma arc torch 100 of FIG. 1. The plasma arc torch 100 can include one or more consumables including the nozzle 110, the electrode 105, the shield 125, the inner retaining cap 115 and an outer retaining cap 302. At least one signal device 202 is assigned to at least one of the consumables for transmitting information about the corresponding consumable to the processor 206 via the receiver 204. The system 300 also includes a power supply 304 for providing the electrical current necessary to generate plasma arc in the torch 100. Data collected from the signal devices 202 about the respective consumables can be used by the processor 206 to control and optimize the operation of at least one of the plasma power supply 304, the motors and drivers 306, the gas console 308, the height controller 310 and the nesting software 312.

The processor 206 can be located inside or outside of the plasma arc torch 100. In some embodiments, the processor 206 is housed in the power supply 304. In some embodiments, each of the plasma power supply 304, the motors and drivers 306, the gas console 308, the height controller 310 and the nesting software 312 houses at least one processor for processing data from the signal devices 202 to control the functions of the respective module 304, 306, 308 or 310.

Based on the information collected from the signal devices 202, the processor 206 can regulate many plasma system functions simultaneously or near simultaneously and in real-time or near real-time. These system functions include, but not limited to, start sequence, CNC interface functions, gas and operating parameters, and shut off sequences. In some embodiments, the processor 206 uses consumable information to automatically set various parameters of the system 300. In some embodiments, the processor 206 uses consumable information to verify whether certain preset parameters of the system 300 are compatible with the consumables inside of the torch 100. As an example, based on the data collected about the multiple consumables of the torch 100, the processor 206 can control and verify one or more of the following system components: i) settings of the power supply 304 for regulating power to the torch 100, ii) settings of the nesting software 312 for processing a workpiece, iii) settings of the gas console 308 for controlling shield and/or plasma gases supplied to the torch 100, iv) settings of the height controller 310 for adjusting the height between the torch 100 and the workpiece, and v) settings of various motors and drivers 306.

In some embodiments, based on the data collected from one or more signal devices 202, the processor 206 interacts with the nesting software 312 to automatically select a cutting program that sets parameters for processing a workpiece, such as the cutting speed, direction, paths, nesting sequences, etc. The cutting program can also define the gas types, gas pressure and/or flow settings and height control settings for the torch in view of the collected consumable data. Traditionally, when a set of consumables is assembled into a torch, an operator needs to manually configure the nesting software 312 to create the cutting program for the torch by supplying information to the software including the type and thickness of the workpiece material being processed, the type of gas being used, and the current rating of the consumable set. In particular, the operator needs to manually input into the processor 206 the current rating of the consumable set. In the present invention, because the current rating information for each consumable is stored in at least one signal device 202, the processor 206 can electronically collect such information from the one or more signal devices 202 and automatically determine the appropriate current setting without user input.

In some embodiments, based on the collected consumable data, the processor 206 selects a suitable cutting program from the nesting software 312 by taking into consideration of consumable data from the signal devices 202 and user-input operating parameters, including the characteristics of the workpeice being cut and the desired cut shape. For example, an operator can first send a generic program file to the nesting software 312. The generic program file specifies, for each workpiece thickness, variable cut speeds, gas flows, kerf compensations, torch heights, etc. that change with different consumable parts. Thus, after identifying the consumables using the signal devices 202, the processor 206 interacts with the generic program file to configure a cutting program for the torch. In some embodiments, after a cutting program is created, the processor 206 uses consumable data collected from the signal devices 202 to verify whether correct consumables are installed into the torch that are appropriate for the program. In addition, the processor 206 can instruct the nesting software 312 to automatically set or correct parameters of the program to enhance compatibility with the consumables loaded into the torch. For example, a consumable requiring 400 A current has larger kerfs and lead-ins in comparison to a consumable requiring 130 A current. Accordingly, the nesting software 312 can select fewer parts to fit on a nest of the program if the 400 A consumable is loaded into a torch.

In some embodiments, based on the data collected from one or more signal devices 202, the processor 206 can manipulate a gas console 308 to control flow of plasma and shield gases to the torch 100 by verifying and adjusting the gas console settings. The gas console 308 houses solenoid valves, flow meters, pressure gauges, and switches used for plasma and shield gas flow control. For example, the flow meters are used to set the pre-flow rates and cut flow rates for the plasma and shield gases. The gas console 308 can also have a multi-inlet gas supply area where the plasma and shield gases are connected. A toggle switch can be used to select the desired gases. The plasma and shield gases are monitored by gas pressure gauges. In one example, a signal device 202 associated with the shield 125 of the plasma arc torch 100 can store information about the type and composition of one or more shield gases suitable for use with the shield 125, along with the optimal flow rate setting of the shield gases. Based on this data, the processor 206 can interact with the gas console 308 to provide the plasma arc torch 100 with the appropriate shield gas at the optimal flow rate.

In some embodiments, based on the data collected from one or more signal devices 202, the processor 206 manipulates the torch height controller 310, which sets the height of the torch 100 relative to the workpiece. The torch height controller 310 can include a control module to control an arc voltage during cutting by adjusting the standoff (i.e., the distance between the torch 100 and the work piece) to maintain a predetermined arc voltage value. The torch height controller 310 can also include an external control module to control the standoff. The torch height controller 310 can further include a lifter, which is controlled by the control module through a motor or driver 306, to slide the torch 100 in a vertical direction relative to the workpiece to maintain the desired voltage during cutting. In one example, based on the data collected from the consumables of a torch, the torch height controller 310 can automatically determine the height to position the torch relative to the top of a workpiece. Therefore, the torch height controller 310 does not need to perform a height sense in order to set an appropriate pierce height and cut height before beginning arc voltage control.

In some embodiments, the processor 206 is configured to prevent the thermal processing system 300 from commencing an operation on the workpiece if it determines that the consumables installed in the torch 100 are mismatched with each other, not compatible with the thermal processing system 300 or inconsistent with other pre-selected operating parameters input by an operator. If such a determination is made, the processor 206 can trigger an audio or visual alert indicating to the operator that one or more of the connected consumables are unsupported and that the consumables should be replaced or operator inputs should be revised. Additionally, the processor 206 can prevent initiation of an operation if an alert is triggered. For example, the processor 206 can stop torch operation if the current setting of the shield 125, which is conveyed to the processor 206 by a signal device 202 assigned to the shield 125, is different from the current setting of the nozzle 110, which is conveyed to the processor 206 by a different or the same signal device 202 corresponding to the nozzle 110.

In some embodiments, the processor 206 is configured to prevent the thermal processing system 300 from operating if it determines that at least one of the consumables installed in the torch 100 is not manufactured or otherwise supported by an accepted manufacturer. For example, the processor 206 can stop torch operation if it does not recognize the manufacturer identification, serial number and/or parts number conveyed by a signal device of a consumable. Hence, the thermal processing system 300 can be used to detect and prevent the use of inferior or counterfeit consumables.

In some embodiments, the processor 206 recommends one or more remedial actions to the operator to address alarm situations. For example, the processor 206 can suggest one or more consumables to install in the torch 100 to avoid potential mismatch with other components of thermal processing system 300. The processor 206 can suggest suitable types of workpiece for processing based on the ratings of the installed consumable set. The processor 206 can recommend a cutting sequence that reconciles the settings of the installed consumables with settings provided by the operator.

Generally, the signal devices 204 can store information about torch components other than consumables. For example, the signal devices 204 can store information about the torch body 102 or about one or more leads. Therefore, as one in the art will fully appreciate, the exemplary communication network 200 of FIG. 2 and the configuration of FIG. 3 can be easily adapted to store information about any torch component.

In addition, as one in the art will fully appreciate, the invention described herein is not only applicable to plasma cutting devices, but also welding-type systems and other thermal processing systems. In some embodiments, the invention described herein is configured to operate with a variety of cutting technologies, including, but not limited to, plasma arc, laser, oxy fuel, and/or water-jet technologies. For example, the signal devices 202 can be coupled to one or more consumables configured to operate with one or more of the cutting technologies. The processor 206, using information transmitted by the signal devices 202, can determine whether the consumables installed in a torch are compatible with the specific cutting technology. In some embodiments, based on the selected cutting technology and the consumable information, the processor 206 can set or adjust operating parameters accordingly, such as the height of the cutting head above the workpiece, which can vary depending on the cutting technology and the consumables.

As an example, it is known to use water-jet systems that produce high pressure, high-velocity water jets for cutting various materials. These systems typically function by pressurizing water or another suitable fluid to a high pressure (e.g., up to 90,000 pounds per square inch or more) and force the fluid through a small nozzle orifice at high velocity to concentrate a large amount of energy on a small area. An abrasive jet is a type of water jet, which can include abrasive materials within the fluid jet for cutting harder materials. In some embodiments, the signal devices 202 are attached to consumables of a water-jet system, such as to a water-jet nozzle, an abrasive-jet nozzle, a mixing tube used to mix abrasive particles with fluid, and/or one or more valves and filters. A signal device 202 associated with an abrasive jet nozzle can identify, for example, the types of abrasives suitable for use with the nozzle, the amount of pressure in the pressurized fluid that can be fed to the nozzle, and can also indicate other consumables that are suitable for use with a particular nozzle. Identification of particular consumable set combinations for a given water-jet system can also be performed, to verify compatibility with a given system or to limit operating conditions and parameters, such as maximum pressure or flow settings, or abrasive types or amounts.

It should also be understood that various aspects and embodiments of the invention can be combined in various ways. Based on the teachings of this specification, a person of ordinary skill in the art can readily determine how to combine these various embodiments. In addition, modifications may occur to those skilled in the art upon reading the specification. The present application includes such modifications and is limited only by the scope of the claims.

What is claimed is:

1. A consumable component of a thermal processing torch that includes a receiver disposed inside of the thermal processing torch, the consumable component comprising:
    a consumable component body; and
    a signal device, comprising a radio-frequency identification (RFID) tag, located on or within the consumable component body for transmitting a signal associated with the consumable component, the signal being independent of a detectable physical characteristic of the consumable component,
    the signal device being configured to store information to be conveyed by the signal identifying two or more of the consumable's name, trademark, manufacturer, serial number, usage history, at least one operating parameter, and type, and
    the signal device being located inside of the thermal processing torch when the consumable component is installed in the thermal processing torch and the signal device being configured to allow the signal to be readable by the receiver inside the thermal processing torch.

2. The consumable component of claim 1 wherein the signal transmitted by the signal device identifies at least one feature unique to the type of the consumable component.

3. The consumable component of claim 2, wherein the type of the consumable component comprises a nozzle, a shield, an electrode, an inner retaining cap, an outer retaining cap, a swirl ring or a welding tip.

4. The consumable component of claim 1, wherein the signal transmitted by the signal device identifies at least one feature unique to the consumable component that is capable of distinguishing the consumable component from another consumable component of the same type.

5. The consumable component of claim 1 wherein the signal device is located at a surface of the body to minimize heat exposure during torch operation.

6. The consumable component of claim 5 wherein the surface is adjacent to a cooling mechanism of the thermal processing torch, spaced away from a plasma arc emitted from the thermal processing torch, or in an o-ring channel of the thermal processing torch, or a combination thereof.

7. The consumable component of claim 5 wherein the signal device is shielded by another torch component to minimize exposure of the signal device to at least one of thermal energy, radiation, damaging gases, or high-frequency energy.

8. The consumable component of claim 1 wherein the signal device is adapted to transmit the signal before, during or after plasma arc ignition, or a combination thereof.

9. The consumable component of claim 1 wherein the thermal processing torch comprises a plasma arc torch.

10. A system for conveying information about a thermal processing torch, the system comprising:
    a signal detector;
    at least one consumable selected from a group comprising: an electrode, a nozzle, a shield, a retaining cap, a welding tip, and a swirl ring;
    at least one signal device, comprising a radio-frequency identification (RFID) tag, attached to the at least one consumable for conveying information about the at least one consumable to the signal detector,
    the at least one signal device being configured to store the information identifying at least one operating parameter of the torch and a value for the at least one operating parameter, and
    the signal device being located inside of the thermal processing torch when the consumable component is installed in the thermal processing torch and the signal device being configured to allow the information to be readable by the signal detector inside the thermal processing torch; and
    a controller coupled to the signal detector for i) receiving the information from the at least one signal device, and ii) transmitting at least a portion of the information to at least one of a processor, a gas console, nesting software, a height controller, and a drive motor, wherein at least one of the processor, the gas console, the nesting software, the height controller, and the drive motor adjusts torch operation based on the value of the at least one operating parameter.

* * * * *